Jan. 5, 1960  D. B. MAPES  2,919,978
PULSE EXTRACTION COLUMN

Filed Dec. 14, 1956  2 Sheets-Sheet 1

*INVENTOR.*
DWIGHT B. MAPES
BY
*ATTORNEY*

United States Patent Office 2,919,978
Patented Jan. 5, 1960

2,919,978
PULSE EXTRACTION COLUMN

Dwight B. Mapes, Tulsa, Okla., assignor to Pan American Petroleum Corporation, a corporation of Delaware Application December 14, 1956, Serial No. 628,301

5 Claims. (Cl. 23—270.5)

The present invention relates to an improved method and apparatus for the extraction of components contained in a first liquid phase by the use of a second liquid substantially immiscible in said first liquid phase. More particularly, it is concerned with a novel method and apparatus for effecting a pulsed extraction operation between substantially immiscible liquid phases having different densities.

It is known that the efficiency of a pulsating type extraction column may be up to four or five times greater than that of a conventional sieve plate extraction column of equal length. One of the chief disadvantages of the use of a commercial pulsating type column, however, has been in the cost of the specially constructed large volume reciprocating pump required to effect the desired degree of pulsation. Commercial extraction columns range in size up to about six feet in diameter or larger. The cost of reciprocating pumps required for such columns to produce the necessary degree of surging or pulsation of the column liquids offsets the economy of lower column height. For example, if it is desired to carry out a pulsed extraction operation in a column four or five feet in diameter, using a reciprocating type pump, the amplitude of the pulse produced will depend on the volume of the pump cylinder. With an amplitude of only two or three inches, using a column of the above indicated size, it is seen that an appreciable volume of liquid must be injected into and withdrawn from the column to produce a pulse of the desired amplitude. To do this it will be apparent that correspondingly large reciprocating pumps must be used. Thus, while it is recognized that a given separation efficiency can be attained with fewer plates and less column height when the column is pulsed, the economics of the pulsed column are more than offset by the cost of the reciprocating pump and the power required to operate it. Accordingly, the conventional sieve plate extraction system is usually selected for commercial operations.

It is an object of my invention to provide a method and apparatus capable of effecting the pulsed type extraction of liquids without the use of reciprocating pumps while realizing a substantial savings in initial investment expenditures for extraction equipment due to a shorter extraction column with fewer extraction stages. It is another object of my invention to produce pulsations in the liquid column within an extractor by withdrawing liquid from the base of said extractor for a given period of time, thereafter injecting at substantially the same rate a portion of the liquid thus withdrawn into a lower region of said extractor while both solvent and liquid to be extracted are continuously fed to the extractor. It is another object of my invention to provide apparatus for imparting pulsations to an extraction column comprising a reservoir, a first conduit having a valve therein and extending from the bottom of the extraction column to said reservoir and a second conduit having pumping means for forcing liquids therethrough and a valve in said second conduit, the latter extending from a lower portion of said reservoir to a lower portion of said column, said valves operating in intermittent alternate open and closed relationship.

Figure 1:
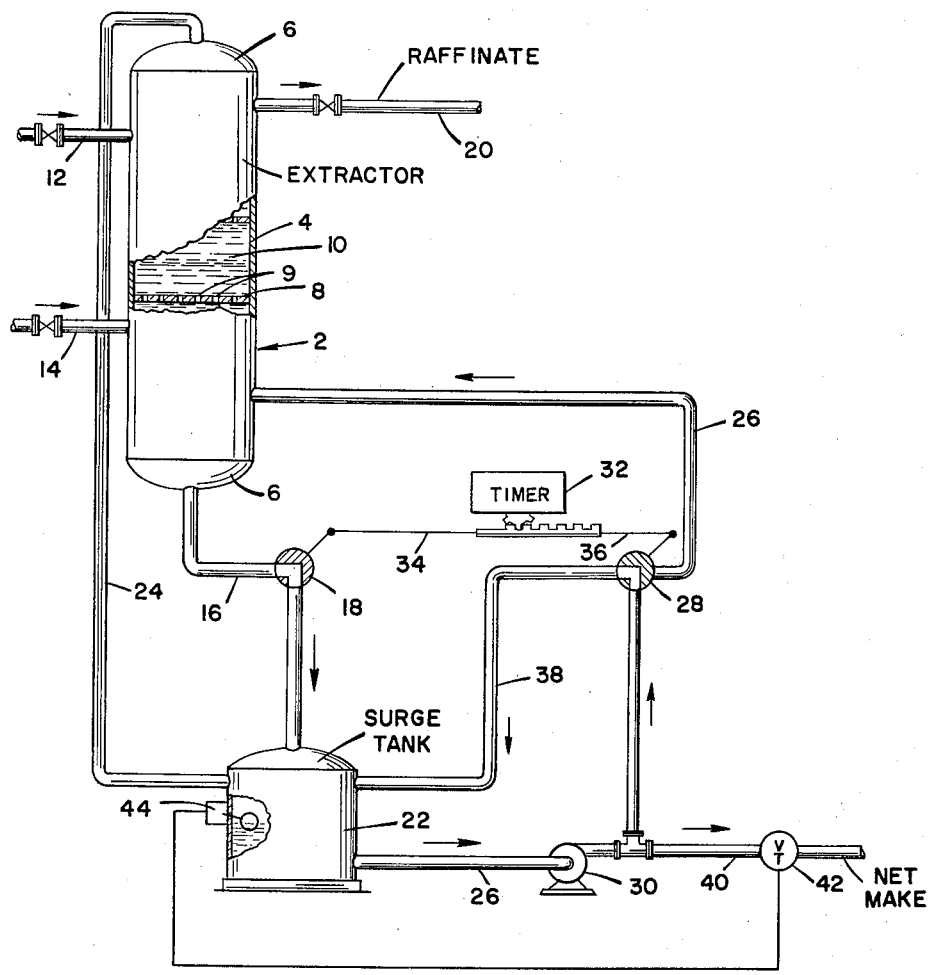
Figure 1 is an elevational view partly in section of one embodiment of my invention showing a particular arrangement of flow and by-pass lines in combination with a continuous flow pump by which pulsations within the extraction column can be produced.

Referring now to Figure 1 an extraction column 2 comprises an elongated cylindrical vessel 4 closed at both ends by hemispherical caps 6. Within the extractor are vertically spaced plates 8, with perforations 9, defining individual extraction zones 10. In place of such plates sections of metal wool or sections of ordinary column packing may be used, the function of the plates or sections being to disperse the heavy liquid in a given zone into the light liquid in the next lower individual zone when the entire column of liquid receives a downward pulse and to disperse the light liquid of one zone into the heavier liquid of the next higher separate zone in a similar manner on an upward pulse. The number of plates used and the distance between them in an extraction apparatus, of course, may vary widely and in general will depend upon the nature of the liquids and the degree of extraction desired. The plates should, however, be spaced a sufficient distance apart to permit a suitable settling or stratification of the light liquid and heavy liquids between each pulse. Heavy liquid is continuously fed to the system at a constant rate through conduit 12 while lighter liquid is fed through conduit 14. At intervals ranging from about one second to about thirty seconds, preferably from about two to about twelve seconds, extract is discharged into a high capacity conduit 16 having a quick acting valve, for example a solenoid valve, 18. Raffinate flows out of the system through conduit 20. Conduit 16, which may have a flow rate of twice the pulse rate, leads into a reservoir or surge tank 22 having a capacity several times, for example, four or five times, the required volume to produce the pulse in the column of liquids. A pressure equalizing line 24 extends from tank 22 to the top of column 2 to avoid pressure surges in tank 22 which would otherwise be produced by the intermittent flow of liquid through conduit 16. Liquid is carried from reservoir 22 through conduit 26 and three-way valve 28 by means of a centrifugal or other continuous flow high capacity pump 30 and returned to a lower portion of column 2, preferably below the level at which liquid is introduced into the system through conduit 14. A timing device 32, which may be electronic, is connected to valves 18 and 28 through lines 34 and 36. Timer 32 is operated so that when valve 18 is open valve 28 is actuated such that flow through conduit 26 is halted and then diverted through conduit 38 thereby returning liquid to surge tank 22. The time cycle employed is preferably such that on their respective "on" periods substantially the same quantity of liquid flows through conduits 26 and 38. During the continuous flow of liquid through conduit 26 from the discharge side of pump 30 a flow of heavy liquid and dissolved materials from the lighter liquid is maintained through line 40. After operations become lined out the overall flow of liquid sent to further processing through conduit 40 and control valve 42 is substantially equal to the net make of extract solution from the system. The quantity of liquid passing through valve 42 at any given time, however, depends on the volume of liquid in reservoir 22. Thus, when the liquid in reservoir 22 reaches a predetermined level, for example, at least twice the desired pulse volume, a suitable liquid level control means 44, such as a snap action valve, actuates valve 42 permitting a larger flow of liquid therethrough until the level of liquid in tank 22 has been lowered by a specific amount at which time the flow through valve 42 is again restricted. Conduit 16 and valve 18 should have sufficient capacity to allow the pulse volume plus the new make of extract to flow into tank 22 by gravity during the time valve 18 is open. It will be apparent that the valves may be set to operate via timer 32 at any desired frequency.

Figure 2:
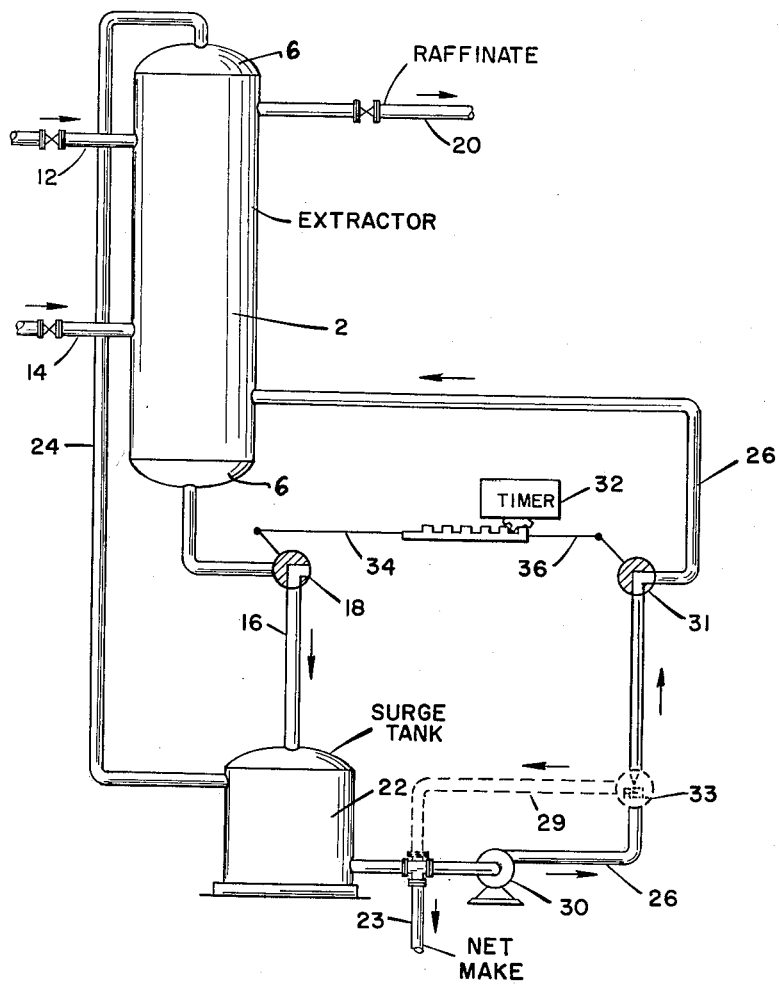
Figure 2 is likewise an elevational view partly in section employing a simplified arrangement of flow lines, values and pumping means to produce the desired pulses within the column.

Figure 2 represents another embodiment of my invention employing a somewhat more simplified flow design than that shown in Figure 1. Thus, heavy and light liquids are continuously introduced into column 2 through conduits 12 and 14, respectively, at a constant rate. Heavy liquid, together with dissolved components from the lighter liquid, is taken from column 2 through high capacity conduit 16 and valve 18 and flows into surge tank 22. Raffinate passes from the column through conduit 20. After the desired time has elapsed valve 18 is closed and valve 31 opened. The operation of these valves is controlled by an automatic timing device 32 having lines 34 and 36, respectively, to valves 18 and 31. During the period valve 18 is open pump 30 continues to operate against closed valve 31. In normal operation with valve 31 open, the discharge pressure of pump 30 needs only be sufficient to overcome the hydrostatic head of the column of liquid in extractor 2. On opening valve 31 and closing valve 18 a surge of liquid in conduit 26 passes into column 2 producing the desired pulse in the column of liquid contained therein. Net make extract in tank 22 is continuously or intermittently withdrawn from the system for further processing through line 23.

A variation in the design shown in Figure 2 consists in the use of a by-pass conduit shown as dotted line 29 running from conduit 26 on the intake side of pump 30 to overpressure control valve 33. On the cycle of the process in which conduit 16 and valve 18 are open valve 31 is closed. Valve 18 opens dropping the pressure in conduit 26 between extractor 2 and valve 31. However, the pressure in conduit 26 between valve 31 and pump 30 is increased. Likewise, the pressure in conduit 29 is increased by operation of control valve 33, which closes with respect to flow of liquid through conduit 26 toward valve 31 owing to pressure build-up in conduit 26 between valves 31 and 33. Under such conditions, valve 33 opens with respect to conduit 29, increasing the pressure therein and causing liquid to recycle through bypass conduit 29 while valve 18 is open. When the pressure builds up in line 26 slightly in excess of normal operating pressures, for example five to ten pounds in excess, valve 33 opens with respect to line 29 permitting liquid to recycle in the system via conduit 26 and 29 until the time cycle is completed. Thereafter flow proceeds through conduit 26 for the required period as previously described.

My invention is further illustrated by the following specific example:

*Example*

Into an upper level of an extraction column having an I.D. of 2.067-inches an aqueous solution saturated with respect to acetic acid (3.5 weight percent) and ethyl acetate (7.3 weight percent) is introduced at the rate of 1.5 gallons per hour. At a lower level of the column a stream consisting of 97 weight percent ethyl acetate and 3 weight percent water is countercurrently injected at the rate of 2.1 gallons per hour. The column has 16 actual plates spaced 6-inches apart. The plates are perforated, with one-half inch of McMahon packing (0.25-inch saddles shaped from 50 mesh stainless steel wire) on either side thereof supported on stainless steel screens. The system employed for producing pulses in the extraction column is substantially identical to that shown in Figure 1 of the drawings.

The column was operated at 66 pulses per minute having an amplitude of 0.2-inch. The required capacity of the centrifugal pump used to give this amplitude and pulse frequency is 22.6 gallons per hour. The overall stage efficiency obtained is 80 percent which compares to an overall stage efficiency of about 25 percent using an unpulsed extraction column of equal length operating with liquids of the above indicated composition.

Although the embodiment of the invention described contemplates the use of a light liquid containing dissolved materials to be extracted by a heavier solvent flowing in countercurrent contact therewith, it is to be understood that this system works equally well in cases where the dissolved material to be extracted is in solution in the heavier liquid and the solvent is the lighter liquid. The example given to illustrate the increase in extraction efficiency when using a column pulsed by the means described is a case where the solvent (ethyl acetate) is the lighter liquid and the heavier liquid is water saturated with respect to acetic acid and ethyl acetate. This was used because it is a simple but effective means of demonstrating extraction efficiency.

The method and apparatus of my invention may be used to advantage in any system in which conventional liquid-liquid extraction is known to be operative. My invention is particularly effective in the extraction of hydrocarbon synthesis neutral oil with aqueous soap solutions. Other applications and modifications of my invention which would ordinarily occur to those skilled in this art are considered to lie within the scope thereof.

I claim:

1. Apparatus for intimately mixing and imparting pulsations to substantially immiscible liquids comprising in combination an extraction column, a first inlet for continuously introducing a liquid near the top of said column, a second inlet for continuously introducing a liquid near the base of said column, means near the top of said column above said first inlet for substantially continuously withdrawing liquid raffinate from said column, a reservoir, a first conduit having a valve therein and extending from the base of said column to said reservoir, and a second conduit having means for continuously forcing liquid therethrough, a valve in said second conduit on the downstream side of said means, a third conduit having one end operatively connected with the last-mentioned valve and the other end leading to said reservoir, said last-mentioned valve opening into said third conduit when said second conduit is closed, said second conduit extending from a lower portion of said reservoir to a lower portion of said column, said valves operating an intermittent alternate open and closed relationship.

2. Apparatus for intimately mixing and imparting pulsations to substantially immiscible liquids comprising in combination a column, a first inlet for continuously introducing a liquid near the top of said column, a second inlet for continuously introducing a liquid near the base of said column, means near the top of said column above said first inlet for substantially continuously withdrawing liquid raffinate from said column, a reservoir, a conduit (1) having a valve therein and connecting the base of said column with said reservoir, a conduit (2) from said reservoir to a lower portion of said column having a continuous pumping means for forcing liquids through conduit (2), a by-pass conduit extending from said reservoir to a point on conduit (2) on the discharge side of said pumping means, a valve means for intermittently alternating the flow of said liquid from conduit (2) to said by-pass conduit, and timing means for controlling said valves, said timing means being adapted and arranged to alternately and intermittently (a) open the valve in conduit (1), close said valve means with respect to conduit (2) and open said valve means with respect to said by-pass conduit, and (b) close the valve in conduit (1), close said valve means with respect to said by-pass conduit and open said valve means with respect to conduit (2).

3. Apparatus for intimately mixing and imparting pulsations to substantially immiscible liquids comprising in combination a column, a first inlet for continuously introducing a liquid near the top of said column, a second inlet for continuously introducing a liquid near the base of said column, means near the top of said column above said first inlet for substantially continuously withdrawing liquid raffinate from said column, a reservoir, a conduit (1) having a valve therein and connecting the base of said column with said reservoir, a conduit (2) having a continuous flow pumping means, conduit (2) extending from said reservoir to a lower portion of said column, a by-pass conduit running from conduit (2) on the discharge side of said pumping means to said reservoir and means for alternately and intermittently (a) opening conduit (2) and closing said by-pass conduit and conduit (1), and (b) closing conduit (2) and opening said by-pass conduit and conduit (1).

4. Apparatus for intimately mixing and imparting pulsations to substantially immiscible liquids comprising in combination a column, a first inlet for continuously introducing a liquid near the top of said column, a second inlet for continuously introducing a liquid near the base of said column, means near the top of said column above said first inlet for substantially continuously withdrawing liquid raffinate from said column, a reservoir, a conduit (1) having a valve (2) therein and connecting the base of said column with said reservoir, a conduit (3) having a continuous flow pumping means, conduit (3) extending from said reservoir to a lower portion of said column, a by-pass conduit extending from a point on conduit (3) located on the intake side of said pumping means to a point on conduit (3) located on the discharge side of said pumping means, a pressure actuated valve connecting said by-pass conduit with conduit (3) on the discharge side of said pumping means, a valve (4) in conduit (3) between said column and said pressure actuated valve, and means for alternately and intermittently (a) opening valve (2) and closing valve (4), and (b) opening valve (4) and closing valve (2).

5. Apparatus for intimately mixing and imparting pulsations to substantially immiscible liquids comprising in combination an extraction column, a first inlet for continuously introducing a liquid near the top of said column, a second inlet for continuously introducing a liquid near the base of said column, means near the top of said column above said first inlet for substantially continuously withdrawing raffinate from said column, a reservoir, a first conduit having a valve therein and extending from the base of said column to said reservoir, a second conduit having a valve therein and means for continuously forcing a liquid therethrough, a third conduit having one end operatively connected with the last-mentioned valve and the other end leading to said reservoir, said last-mentioned valve opening into said third conduit when said second conduit is closed, said second conduit extending from a lower portion of said reservoir to a lower portion of said column, said valves operating in intermittent alternate open and closed relationship, and pressure equalizing means communicating with said extraction column and said reservoir.

References Cited in the file of this patent
UNITED STATES PATENTS

| 2,065,926 | Parker | Dec. 29, 1936 |
| 2,729,550 | Maycock et al. | Jan. 3, 1956 |
| 2,743,170 | Burger | Apr. 24, 1956 |

OTHER REFERENCES

Sege and Woodfield: Chem. Eng. Progress, August 1954, pages 396–402.

UNITED STATES PATENT OFFICE

CERTIFICATE OF CORRECTION

Patent No. 2,919,978                                              January 5, 1960

Dwight B. Mapes

It is hereby certified that error appears in the printed specification of the above numbered patent requiring correction and that the said Letters Patent should read as corrected below.

Column 2, line 11, for "values" read -- valves --; column 3, line 62, for "2,067-inches" read -- 2.067-inches --; column 4, line 51, for "an" read -- in --; column 6, line 14, after "withdrawing" insert -- liquid --.

Signed and sealed this 21st day of June 1960.

(SEAL)
Attest:

KARL H. AXLINE                                            ROBERT C. WATSON
Attesting Officer                                         Commissioner of Patents